United States Patent
Zhou

(10) Patent No.: US 9,432,676 B2
(45) Date of Patent: Aug. 30, 2016

(54) RDO-BASED SMALL TRANSFORM COEFFICIENTS SUPPRESSION ALGORITHM FOR HEVC

(71) Applicant: BROADCOM CORPORATION, Irvine, CA (US)

(72) Inventor: Minhua Zhou, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 276 days.

(21) Appl. No.: 14/083,339

(22) Filed: Nov. 18, 2013

(65) Prior Publication Data

US 2015/0117520 A1    Apr. 30, 2015

Related U.S. Application Data

(60) Provisional application No. 61/897,130, filed on Oct. 29, 2013.

(51) Int. Cl.
  *H04N 19/18*   (2014.01)
  *H04N 19/132*  (2014.01)
  *H04N 19/147*  (2014.01)

(52) U.S. Cl.
  CPC ............ *H04N 19/18* (2014.11); *H04N 19/132* (2014.11); *H04N 19/147* (2014.11)

(58) Field of Classification Search
  CPC ... H04N 19/18; H04N 19/132; H04N 19/147
  USPC .................................................... 375/240.03
  See application file for complete search history.

(56) References Cited

U.S. PATENT DOCUMENTS

| | | | | |
|---|---|---|---|---|
| 7,327,786 B2* | 2/2008 | Winger | ............... | H04N 19/176 375/240.12 |
| 7,463,782 B2* | 12/2008 | Fuchs | ................. | G06T 9/008 375/E7.142 |
| 7,965,770 B2* | 6/2011 | Hormis | ............... | H04N 7/012 375/240.03 |
| 8,634,462 B2* | 1/2014 | Narroschke | ........ | H04N 19/147 375/240.04 |
| 9,078,008 B2* | 7/2015 | Ye | ...................... | H04N 19/597 |

OTHER PUBLICATIONS

Wiegand "Rate-Distortion Optimization for Video Compression" IEEE Signal Processing Magazine Nov. 1998, pp. 74-90.*

* cited by examiner

*Primary Examiner* — William C Vaughn, Jr.
*Assistant Examiner* — Jae N Noh
(74) *Attorney, Agent, or Firm* — McDermott Will & Emery LLP

(57) ABSTRACT

A device for implementing a rate-distortion optimization (RDO)-based small transform coefficients suppression algorithm includes a processing module, a control block, and a switch. The processing module may be configured to process a prediction residual associated with a transform unit (TU) of a video frame and to generate a number of coefficients and a processed output. The control block may be configured to receive the coefficients and to generate a control signal based on the plurality of coefficients. The switch may be configured to select, as an output of the device, one of the processed output or an output of a zero-out block based on the control signal. The zero-out block may be configured to assign a zero value to each of the plurality of coefficients of the TU to suppress small transform coefficients.

20 Claims, 8 Drawing Sheets

300A

| Slice type | λ[qp] for RDO cost, qp = 0, 1, ..., 51 |
|---|---|
| I Slice | $\alpha_I * 2^{\frac{qp-8}{3}}, \alpha_I = 0.80$ |
| P slice | $\alpha_P * 2^{\frac{qp-8}{3}}, \alpha_P = 0.58$ |
| B slice | $\alpha_B * 2^{\frac{qp-8}{3}}, \alpha_B = 0.46 * \text{clip}(2, 4, \frac{qp-8}{6})$ |

| qp | 0 | 1 | 2 | 3 | 4 | 5 | 6 | 7 | 8 | 9 | 10 |
|---|---|---|---|---|---|---|---|---|---|---|---|
| lambdaVal | 182 | 204 | 230 | 128 | 128 | 128 | 128 | 128 | 128 | 128 | 128 |
| shift | 9 | 9 | 9 | 7 | 7 | 7 | 7 | 7 | 7 | 7 | 7 |
| qp | 11 | 12 | 13 | 14 | 15 | 16 | 17 | 18 | 19 | 20 | 21 |
| lambdaVal | 128 | 128 | 128 | 128 | 128 | 128 | 192 | 192 | 192 | 128 | 128 |
| shift | 7 | 7 | 6 | 6 | 6 | 6 | 6 | 6 | 6 | 5 | 5 |
| qp | 22 | 23 | 24 | 25 | 26 | 27 | 28 | 29 | 30 | 31 | 32 |
| lambdaVal | 160 | 160 | 192 | 192 | 224 | 128 | 144 | 160 | 176 | 208 | 224 |
| shift | 5 | 5 | 5 | 5 | 5 | 4 | 4 | 4 | 4 | 4 | 4 |
| qp | 33 | 34 | 35 | 36 | 37 | 38 | 39 | 40 | 41 | 42 | 43 |
| lambdaVal | 128 | 144 | 160 | 184 | 208 | 232 | 128 | 144 | 164 | 184 | 204 |
| shift | 3 | 3 | 3 | 3 | 3 | 3 | 2 | 2 | 2 | 2 | 2 |
| qp | 44 | 45 | 46 | 47 | 48 | 49 | 50 | 51 | | | |
| lambdaVal | 232 | 130 | 144 | 162 | 182 | 204 | 230 | 129 | | | |
| shift | 2 | 1 | 1 | 1 | 1 | 1 | 1 | 0 | | | |

FIG. 3B

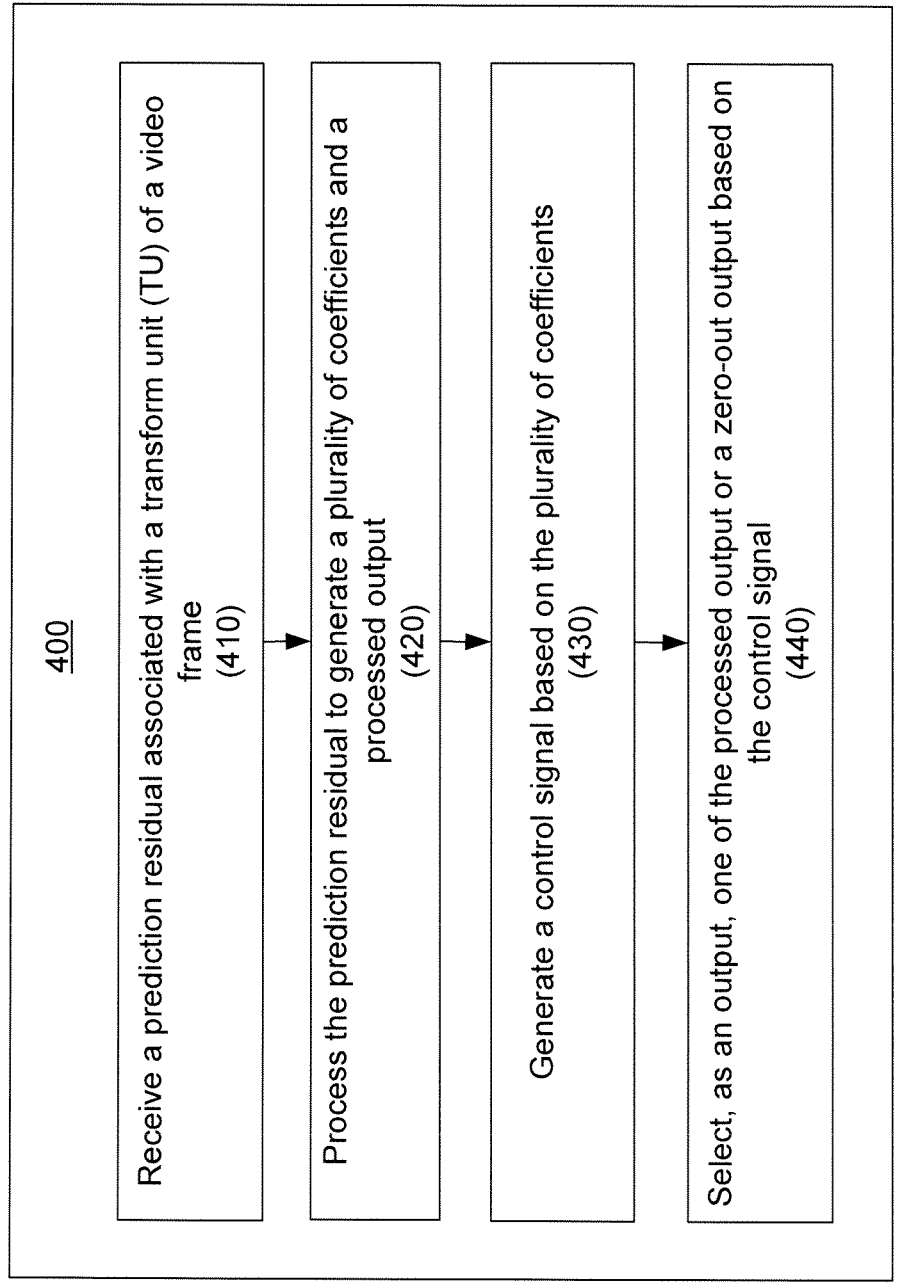

RDO-BASED SMALL TRANSFORM COEFFICIENTS SUPPRESSION ALGORITHM FOR HEVC

CROSS-REFERENCE TO RELATED APPLICATIONS

This application claims the benefit of priority under 35 U.S.C. §119 from U.S. Provisional Patent Application 61/897,130 filed Oct. 29, 2013, which is incorporated herein by reference in its entirety.

TECHNICAL FIELD

The present description relates generally to communication systems, and more particularly, but not exclusively, to rate-distortion optimization (RDO)-based small transform coefficients suppression algorithm for high-efficiency video coding (HEVC).

BACKGROUND

The high-efficiency video coding (HEVC) is a new video compression standard developed by the joint collaborative team (JCT) jointly established by ISO/IEO MPEG and ITU-T. The version 1 HEVC standard for single layer coding was finalized in January 2013, and officially approved by parent body MPEG as MPEG-H and by ITU-T as H.265. The HEVC had a design goal of being at least 50% more efficient than the previous standard MPEG AVC/ITU-T H.264 High profile. To achieve better coding efficiency, HEVC employs a flexible block coding structure. In HEVC, a picture is divided into largest coding units (LCUs) (e.g., up to 64×64 size), and an LCU is further decomposed into coding units (CUs). A CU can be as large as an LCU, and the smallest CU size can be down to 8×8. At the CU level, a CU may be split into prediction units (PUs) with smaller size or equal to CU size for intra- or inter-prediction, and can be split into transform units (TUs) (e.g., with a size from 4×4 to 32×32) for transformation of a prediction residual block.

Within a LCU, some CUs can be intra-coded, while others can be inter-coded. Such a block structure offers coding flexibility of using different PU sizes and TUs sizes based on characteristics of incoming content, especially the ability of using large block size tools (e.g., large prediction unit size up to 64×64 and large transform and quantization size up to 32×32), providing significant coding gain when compared to the 16×16 block based MPEG AVC/ITU-T H.264 coding. After the quantization of transform coefficients, sometimes there are only few isolated small non-zero value coefficients left in a TU. Coding of such isolated small transform coefficients is known to be expensive from the rate-distortion optimization (RDO) point of view.

BRIEF DESCRIPTION OF THE DRAWINGS

Certain features of the subject technology are set forth in the appended claims. However, for purpose of explanation, several embodiments of the subject technology are set forth in the following figures.

FIGS. 3A-3B illustrate examples of lambda expressions and a lambda table used by the control block of FIGS. 1A-1D, in accordance with one or more implementations.

FIG. 4 illustrates an example of a method for suppressing small transform coefficients using an RDO-based algorithm, in accordance with one or more implementations.

DETAILED DESCRIPTION

Figure 1A:
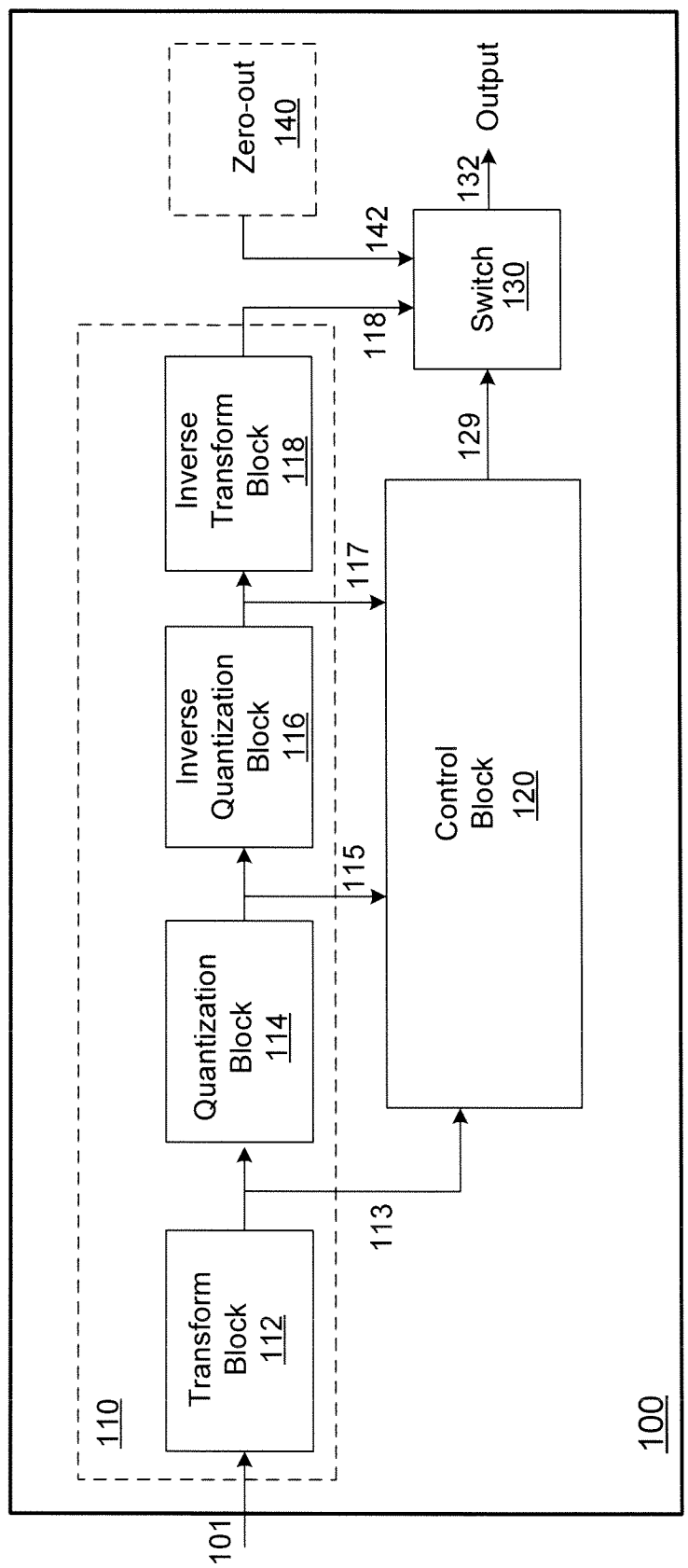
FIGS. 1A-1D are conceptual diagrams illustrating examples of a device for suppressing small transform coefficients using a rate-distortion optimization (RDO)-based algorithm, in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

A method and a system for rate-distortion optimization (RDO)-based small transform coefficients suppression algorithm for high-efficiency video coding (HEVC) are provided. The disclosed technique may allow an RDO-based algorithm to effectively suppress the small transform coefficient during the transform and quantization process to obtain higher compression efficiency. In video processing, after the step of quantization of transform coefficients, sometimes there are only few isolated small value (non-zero) coefficients left in a transform unit (TU), coding of which is known to be expensive from the RDO point of view. It is oftentimes more efficient to eliminate those isolated coefficients from the current TU (i.e. set all the quantized coefficients to zero for the TU). This can result in saving some bits and may allow using more bits for coding of other TUs, which can lead to overall better rate-distortion performance. However, whether it is beneficial to suppress (e.g., set to zero) the small transform coefficients in a TU is both content and bit-rate dependent. The small coefficient suppression algorithm of the subject technology is intelligent enough to adapt a variety of video content and bit-rates.

FIGS. 1A-1D are conceptual diagrams illustrating examples of a device 100 for suppressing small transform coefficients using a rate-distortion optimization (RDO)-based algorithm, in accordance with one or more implementations of the subject technology. The device 100 includes a processing module 110, a control block 120, and a switch 130. The processing module 110 may be configured to process a prediction residual 101 associated with a transform unit (TU) of a video frame. The processing module 110 may generate a number of coefficients and a processed output 118. The coefficients may include original coefficients 113, quantized coefficients 115, and inverse-quantized coefficients 117. The control block 120 may be configured to receive the coefficients (e.g., 113, 115, and 117) and may generate a control signal 129 based on the coefficients. The switch 130 may select, as an output 132 of the device 100, one of the processed output 118 or an output 142 of a zero-out block 140 based on the control signal 129.

The zero-out block 140 may be configured to assign a zero value to each of the plurality of coefficients of the TU. The TU (e.g., with a size from 4×4 to 32×32) may be a part of a coding unit (CU) of a largest coding unit (LCU) of a picture. In one or more implementations, the processing module 110 may include a transform block 112, a quantization block 114, an inverse quantization block 116, and an inverse transform block 118. The processing module 110 may process the prediction residual 101 by performing transformation, quantization, inverse quantization, and inverse transformation on the prediction residual 101, for example, by using the transform block 112, the quantization block 114, the inverse quantization block 116, and the inverse transform block 118, respectively. The structure and functionality of the transform block 112, the quantization block 114, the inverse quantization block 116, and the inverse transform block 118 are known and, for the sake of brevity, are skipped here.

Figure 1B:
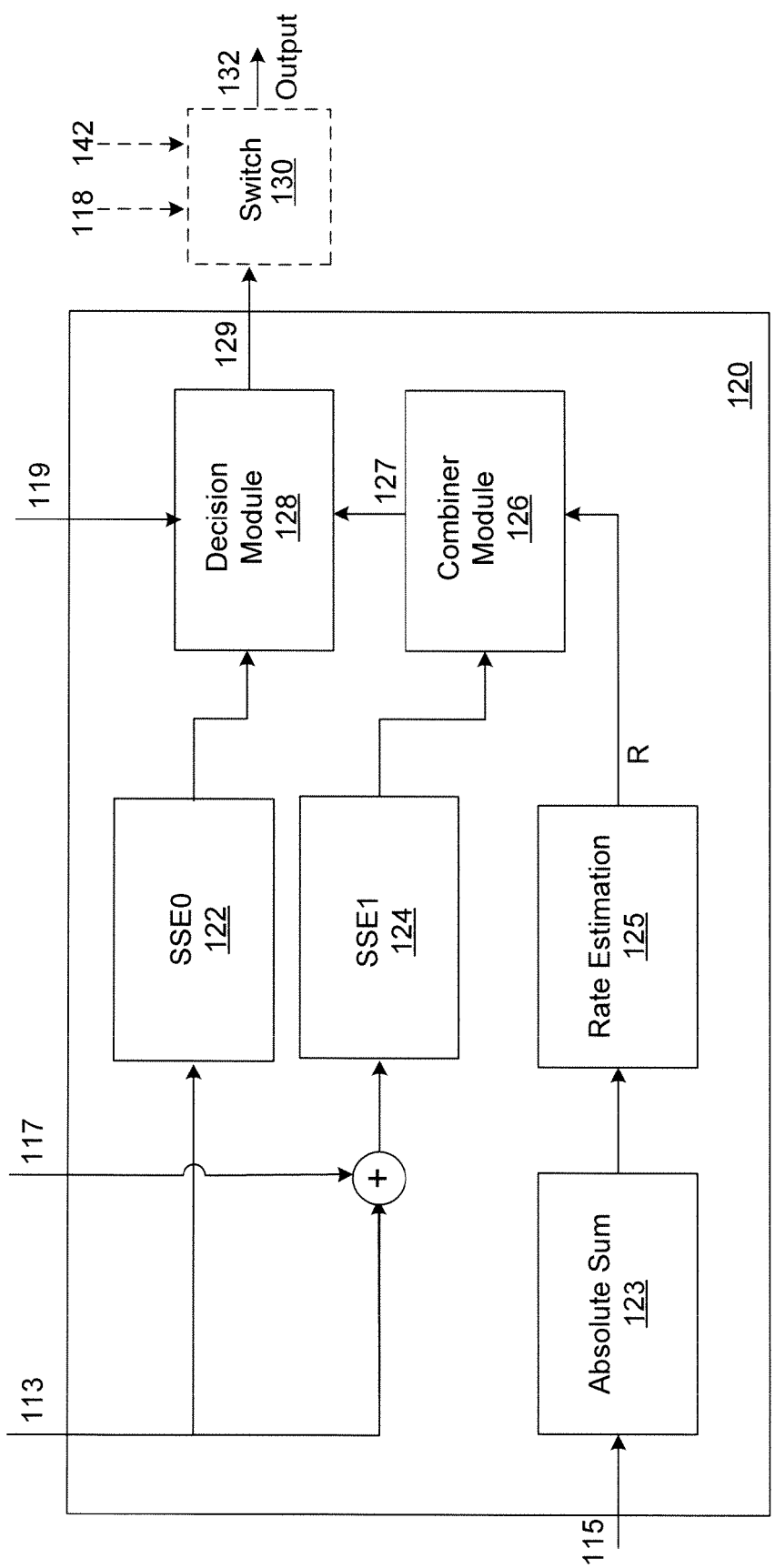

FIG. 1B illustrates an example implementation of the control block 120. The control block 120 may implement an RDO-based algorithm for suppressing the small coefficients. In one or more aspects, the control block 120 may include an absolute sum module 123, a rate estimation module 125, a first sum-of-square error (SSE) module (e.g., SSE0 module) 122, a second SSE module (e.g., SSE1 module) 124, a combiner module 126, and a decision module 128. In one or more aspects, the absolute sum module 123, the rate estimation module 125, the SSE0 module 122, the SSE1 module 124, the combiner module 126, and the decision module 128 may be implemented in hardware or software or a combination of hardware and software. The control block 120 may implement the RDO-based algorithm by determining a first SSE-based distortion parameter (e.g., SSE0), based on the original coefficients 113, a second SSE-based distortion parameter (e.g., SSE1) based on the original coefficients 113 and the inverse quantized coefficients 117, an estimate of a rate R (e.g., a number of bits consumed by the TU). The control block 120 may further uses a parameter λ to combine SSE1 and R, and use the SSE0, the combined SSE1 and R, and DC coefficients to generate the control signal 129, as described in more detail herein. Finally, the control block 120 may use the control signal 129 to select, as an output 132 of the device 100, one of the processed output 118 or the output 142 of the zero-out block 140.

The absolute sum module 123 may determine a sum of the absolute values (e.g., absSum) of the quantized coefficients 115, using;

$$\text{absSum} = \sum_{x=0}^{N-1} \sum_{y=0}^{N-1} |qCoeff[x, y]| \quad (1)$$

Where, qCoeff[x,y] represents one of the quantized coefficients 115 and the summation is over all quantized confidents of the TU. The SSE0 module 122 may determine SSE0 based on the original coefficients 113 for the TU, using the following expression:

$$SSE0 = \sum_{x=0}^{N-1} \sum_{y=0}^{N-1} (coeff[x, y])^2 >> (14 - 2 \cdot \log_2(N)) \quad (2)$$

Where, Coeff [x,y] is one of the original coefficients 113 and the summation is over all quantized confidents of the TU.

The notation >> indicates a bit shift and is followed by the amount of shift (e.g., 2 log$_2$ (N)), and N represents the field size (e.g., the size of the TU, such as 4, 8, 16, or 32).

The SSE1 module 124 may determine the second SSE-based distortion parameter (e.g., SSE1) of the TU with normal quantization as follows:

$$SSE1 = \sum_{x=0}^{N-1} \sum_{y=0}^{N-1} (coeff[x, y] - iqCoeff[x, y])^2 >> (14 - 2 \cdot \log_2(N)) \quad (3)$$

Where, Coeff [x,y] and iqCoeff [x,y] represent one of the original coefficients 113 and inverse quantized coefficients 117, respectively, and the summation is over all quantized confidents of the TU.

The rate estimation module 125 may estimate the rate R based on the absolute value of a sum of the quantized coefficients (e.g., absSum of (1)). The rate R may be estimated by the following logic:

$$R = \begin{cases} 2 & \text{if absSum} = 1 \\ 3 & \text{Otherwise} \end{cases} \quad (4)$$

The RDO cost for the zero-out mode can be simply set to be SSE0. The RDO cost for the normal quantization mode is computed by the combiner module 126.

The combiner module 126 may create a combination 127 of the SSE1 and the estimated rate R (e.g., SSE1+λR). The parameter λ can be determined based on one or more lambda tables, as discussed in more detail herein.

The decision module 128 makes a zero-out decision, which is indicated by the control signal 129. The control signal 129 is generated based on the RDO costs represented by SSE0 and the combination 127, and DC coefficients 119. The zero-out decision is made based on the value of quantized DC transform coefficient, the sum of absolute quantized coefficients and RDO costs of the TU. In one or more aspects, the output 142 of a zero-out block 140 may be selected for the current TU if and only if all the following three conditions are satisfied: (a) quantized DC transform coefficient of the current TU (e.g., qCoeff[0,0]) is equal to zero; (b) the sum of absolute quantized coefficients of the current TU (e.g., absSum) is less than or equal to 2; and (c) SSE0 is less than or equal to SSE1+λR. Otherwise, the output of normal quantization mode (e.g., output 118) is selected for the TU. The zero-out block 140 may perform zeroing out by setting all the quantized transform coefficients, inverse quantized transform coefficients and inverse transform output of the TU to zero.

Figure 1C:
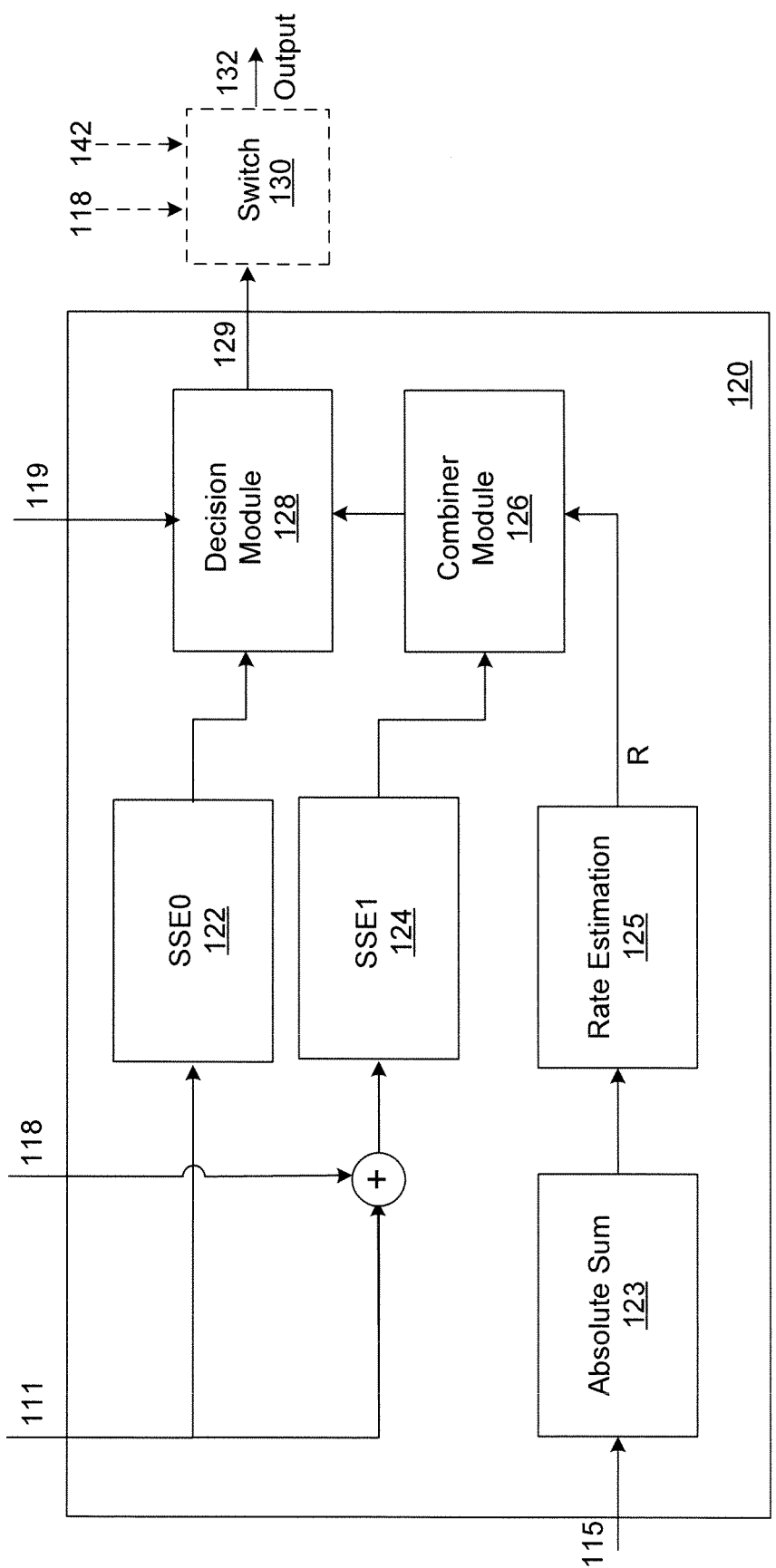

FIG. 1C illustrates another example implementation of the control block 120. The implementation shown in FIG. 1C is similar to the implementation of FIG. 1B, except that the distortion parameters are determined (e.g., computed) in pixel domain. For example, the SSE0 and SSE1 of expressions (2) and (3), which are computed in frequency domain can be computed in pixel domain by using an original residual block 111 (e.g., derived from an input to transform block 112) and the reconstructed residual block resulting from the inverse transform (e.g., 118). The pixel domain and frequency domain SSE computations are mathematically equivalent. The expression for SSE0 for the TU with all the coefficients quantized to zero is given by:

$$SSE0 = \sum_{x=0}^{N-1} \sum_{y=0}^{N-1} (\text{residual}[x, y])^2 \qquad (5)$$

The expression for SSE1 for the TU with normal quantization (e.g., normal without small coefficient suppression) is:

$$SSE1 = \sum_{x=0}^{N-1} \sum_{y=0}^{N-1} (\text{residual}[x, y] - \text{rec}\text{Residual}[x, y])^2 \qquad (6)$$

Where, residual[x,y] and recResidual[x,y], with x, y=0, 1, 2 . . . N−1, are the original residual block (e.g., 111) and the reconstructed residual blocks (e.g., 118), respectively.

Figure 1D:
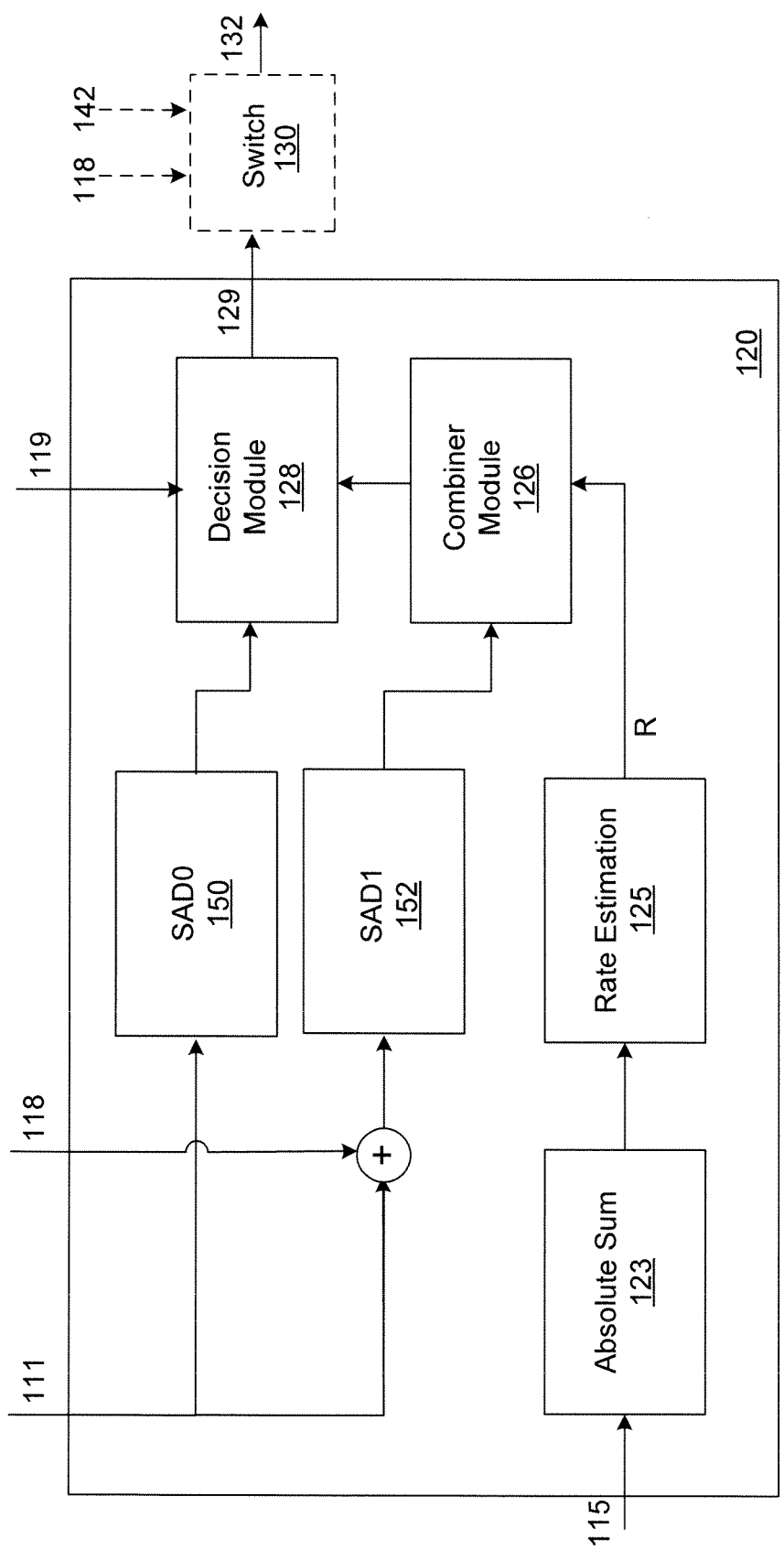

In one or more implementation of the control block 120, as shown in FIG. 1D, instead of using SSE as a distortion metric, other distortion metrics such as sum of absolute difference (SAD) and sum of absolute transform difference (SATD) metrics can be used. These metrics are computed by the SAD0 module 150 and the SAD1 module 152. In this implementation, the lambda tables for computing RDO cost for normal quantization mode need to be different. The SAD for the TU with all the coefficients quantized to zero (e.g., zero-out mode) is given as follows:

$$SAD0 = \sum_{x=0}^{N-1} \sum_{y=0}^{N-1} |\text{residual}[x, y]| \qquad (7)$$

The SAD for the TU with the normal quantization (i.e. normal mode without small coefficient suppression) is calculated as follows:

$$SAD1 = \sum_{x=0}^{N-1} \sum_{y=0}^{N-1} |\text{residual}[x, y] - \text{rec}\text{Residual}[x, y]| \qquad (8)$$

Where, residual[x,y] and recResidual[x,y], with x, y=0, 1, 2 . . . N−1, are the original residual block (e.g., 111) and the reconstructed residual blocks (e.g., 118), respectively.

In some aspects, instead of simple rate estimation method specified in (4), one or more other methods or a combination of them can also be used. The other methods may include, but not be limited to, counting the number of non-zero quantized coefficients, counting the number of context-adaptive binary arithmetic coding (CABAC) bins, or counting the number of bits actually consumed by the TU. In one or more implementations, the threshold for turning on the proposed small coefficient suppression can be different. For example, instead of setting the value of absSum (e.g., of expression (1)) less than or equal to two, the value of the absSum can be set to less than or equal to one to be more conservative, or other larger values to be more aggressive.

In one or more aspects, additional conditions can be added to the zero-out decision process. For example, the number of quantized coefficients in the TU, the absolute value of which is one (e.g., numOnes), may be counted and used to modify the zero-out conditions as follows: (a) quantized DC transform coefficient of the current TU (e.g., qCoeff[0,0]) is equal to zero; (b) the sum of absolute quantized coefficients of the current TU (e.g., absSum) is less than or equal to two; and the number of value 1 quantized coefficients (e.g., numOnes) is larger than zero; (c) SSE0 is less than or equal to SSE1+λR. In this case, the small coefficient suppression algorithm is turned off for TUs with single isolated coefficient of value 2 or −2. Further, the number of value 1 quantized coefficients in the TU, i.e. numOnes, can also be used for modifying the rate estimate, such as:

$$R = \begin{cases} 2 & \text{if absSum} = 1 \\ 3 & \text{if absSum} = 2 \text{ and numOnes} = 0 \\ 4 & \text{Otherwise} \end{cases} \qquad (9)$$

In one or more implementations, the disclosed small coefficients suppression can be independently applied to color components. For example, the algorithm may be disabled for chroma TUs. The above discussed algorithm, which is TU-based, can be extended to be CU-based by accumulating distortion parameters and rate estimate for all the TUs in a CU, and make the zero-out decision jointly among all the TUs in the CU. In this case, not only the transform bits but also other CU-level overhead bits such as TU-split flag and coded-block flag (CBF) of the TU can be considered during the zero-out decision process.

In some implementations, the disclosed algorithm can be extended to be LCU-based by accumulating distortions and rate estimate for all the TUs in a LCU, and making the zero-out decision jointly among all the TUs in the LCU. Further, the subject algorithm can be applied to the other compression standards such as MPEG AVC/ITU-T H.264, MPEG-2/H.262, MPEG-4, and others.

Figure 2:
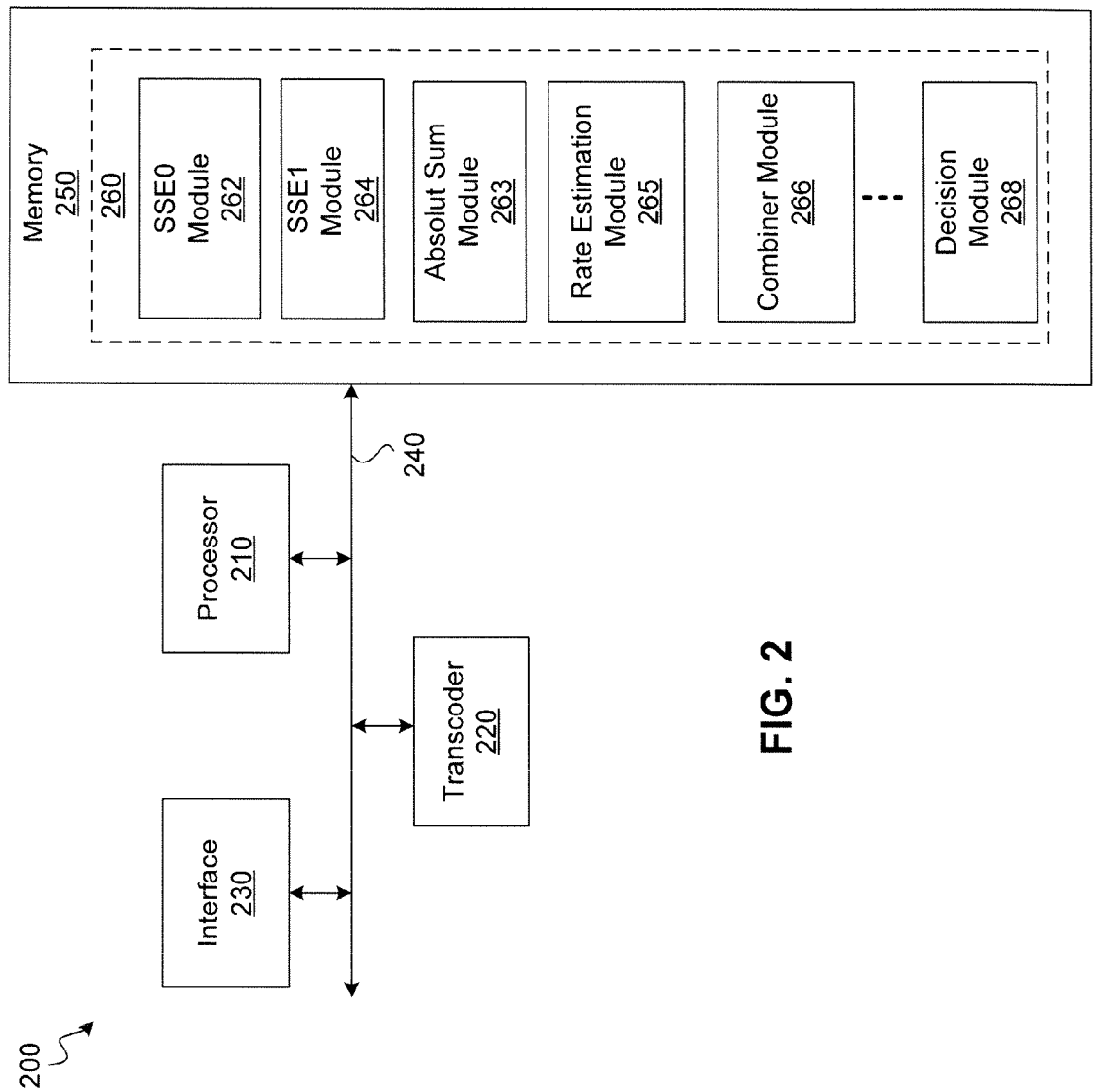
FIG. 2 illustrates an example of a system for suppressing small transform coefficients using an RDO-based algorithm, in accordance with one or more implementations.

FIG. 2 illustrates an example of a system 200 for suppressing small transform coefficients using an RDO-based algorithm, in accordance with one or more implementations. The system 200 may include a processor 210, a transcoder 220, an interface 230, and memory 250, coupled to one another via a bus 240. Examples of the processor 210 may include a general-purpose processor, hardware cores, controllers, or any other type of processor. The interface 230 may perform communications with other devices, such as one or more display devices. In some aspects, the interface 230 may include a network interface that facilitates communications over a network (e.g., the Internet, WLAN, or other networks). The communications may include receiving/sending data packets and/or control packets. The transcoder 220 can be implemented in hardware and may be configured to transcode video and/or audio data files in order to change coding, format, and/or size of the video and/or audio data files for proper presentation.

The memory 250 may include RAM, DRAM, SRAM, T-RAM, Z-RAM, TTRAM, flash memory, or any other type of memory. The memory 250 may include one or more buffers such as video buffers and a number of program modules 260. The program modules 260 may include, for example, a SSE0 module 262, a SSE1 module 264, an absolute sum module 263, a rate estimation module 265, a combiner module 266, and a decision module 268, which when executed by the processor 210 or any other processor may perform the functionalities of the control block 120 of FIGS. 1A-1D and the corresponding modules of the control block 120. For example, the SSE0 module 262, the SSE1 module 264 may be configured to perform the functionalities of the SAD0 150 and SAD1 152 of FIG. 1D.

In other words, in one or more implementations, some or all of the functionalities of the control block 120 may be implemented in software, which may be included in the program modules 260 or stored in another storage device and executed by a processor.

FIGS. 3A-3B illustrate examples of lambda expressions 300A and a lambda table 300B used by the control block 120 of FIGS. 1A-1D, in accordance with one or more implementations of the subject technology. In some aspects, the value of the parameter λ used by the combiner module 126 of FIGS. 1A-1D may be determined based on the slice type (e.g., intra-coded (I) slice, predicted (P) slice, or bi-predictive (B) slice) and a quantization scale parameter (qp). The expressions for calculation of the parameter λ are given in the table of FIG. 3A for different slice types. The value of the quantization scale parameter (qp) may vary, for example, from 0 to 51. The fixed values for the corresponding α parameters (e.g., $\alpha_I$, $\alpha_P$, and $\alpha_B$) are also given in the table.

The values of the parameter λ calculated based on the expressions of FIG. 3A can be tabulated in lambda tables, such as the lambda table 300B, which is an RDO-cost lambda table for SSE metric of a P-slice. To use fixed-point operations a lambda table can be stored in two integer tables, namely a lambda value table and lambda shift table, which are combined in the lambda table 300B. The integer lambda values shown for various qp values, in the lambda table 300B, are not the actual values, but are shifted (to the left) by the corresponding number of bits shown in the shift row of the table 300B. For example, for the first shown lambda value (e.g., 182) of the first row corresponding to qp=0, the value of the shift is indicated as 9. A shift (to the right) by 9 bits of a value is the same as dividing the value by $2^9$, thus the actual value of the lambda corresponding to the shown value of 182 is $182/2^9$. Once the lambda table for SSE metric is obtained the lambda table for SAD and SATD metrics can be calculated by performing the square root operation on each component of the RDO cost lambda table.

FIG. 4 illustrates an example of a method 400 for suppressing small transform coefficients using an RDO-based algorithm, in accordance with one or more implementations of the subject technology. The steps of the method 400 do not need to be performed in the order shown and one or more steps may be omitted. A prediction residual (e.g., 101 of FIG. 1A) associated with a transform unit (TU) of a video frame may be received (e.g., by 110 of FIG. 1A) (410). The prediction residual may be processed (e.g., by 110 of FIG. 1A) to generate a plurality of coefficients (e.g., 113, 115, and 117 of FIG. 1A) and a processed output (e.g., 118 of FIG. 1A) (420). A control signal (e.g., 129 of FIG. 1A) may be generated (e.g., by 120 of FIG. 1A) based on the plurality of coefficients (430). One of the processed output or a zero-out output (e.g., 142 of FIG. 1A) may be selected (e.g., by 130 of FIG. 1A), as an output (e.g., 132 of FIG. 1A), based on the control signal (440). In the zero-out output a zero value may be assigned to each of the plurality of coefficients of the TU to suppress small transform coefficients.

Figure 5:
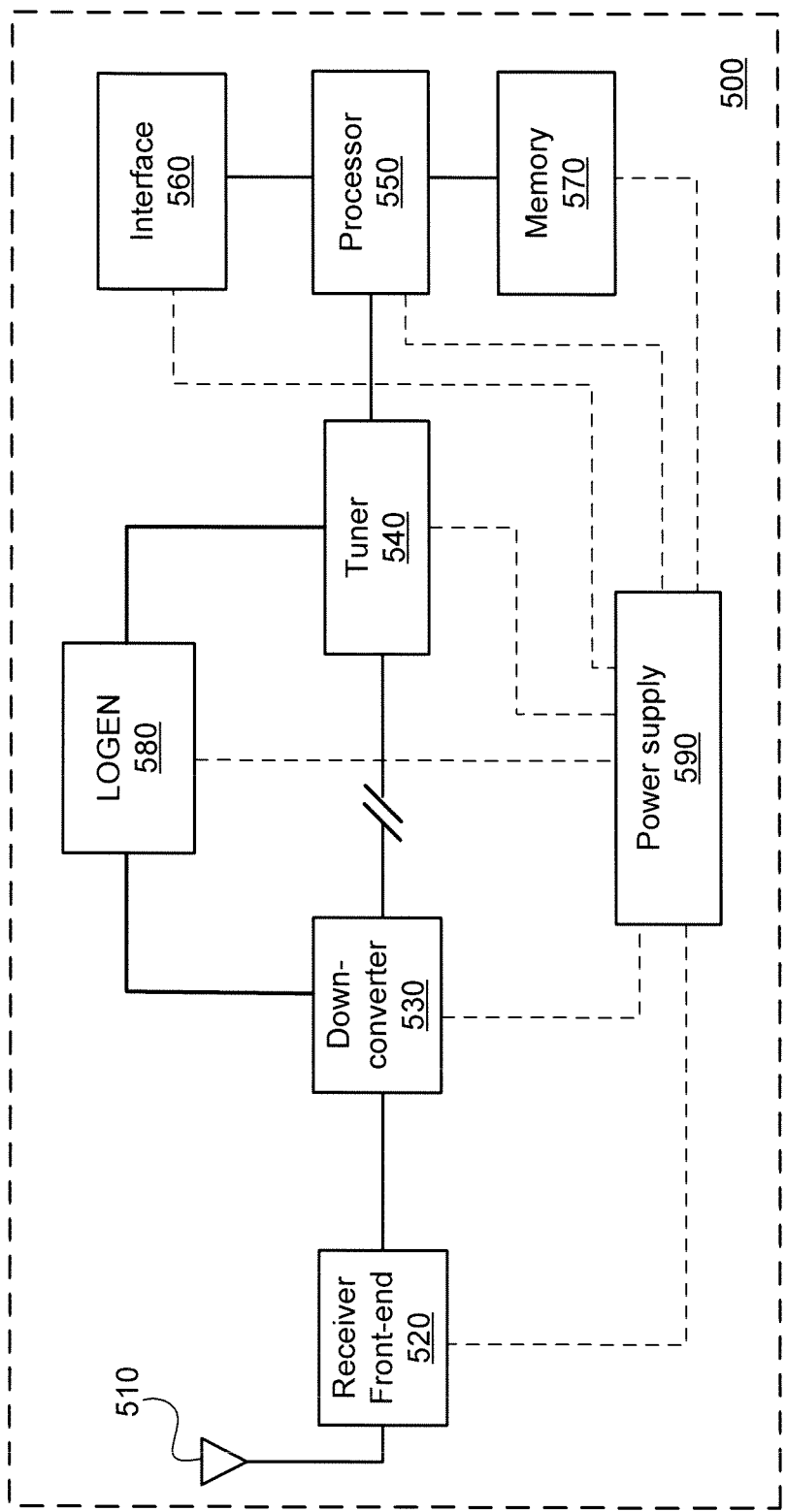
FIG. 5 illustrates an example of a communication device using an RDO-based algorithm to suppress small transform coefficients, in accordance with one or more implementations.

FIG. 5 illustrates an example of a communication device 500 using an RDO-based algorithm to suppress small transform coefficients, in accordance with one or more implementations of the subject technology. The communication device 500 may comprise a broadband communication device such as a set-top box (STB) or a satellite receiver. The communication device 500 may include a feed 510 coupled to a cable or to a satellite antenna, a receiver front-end 520, a down-converter 530, a tuner 540, a processor 550, an interface 560, a memory 570, a local oscillator generator (LOGEN) 580, and a power supply 590. In various embodiments of the subject technology, the communication device 500 may include other modules or components not shown here for simplicity. One or more of the blocks represented in FIG. 5 may be integrated on one or more semiconductor substrates. For example, the blocks 520-580 may be realized in a single chip or a single system on chip, or may be realized in a multi-chip chipset.

In some aspects, the feed 510 may be suitable for receiving broadband signals (e.g., satellite signals) over a wide range of frequencies. Although a single feed 510 is illustrated, the subject technology is not so limited.

In one or more implementations, the receiver front end 520 may include suitable circuitry for amplification of received signals. The circuitry may include a low-noise amplifier such as a wideband LNA. The down-converter 530 may comprise suitable logic, circuitry, interfaces, and/or code that can use local oscillator (LO) signals generated by the LO generator (LOGEN) 580 to down-convert the received signals (e.g., satellite signals) to radio-frequency (RF) signals. The tuner 540 may comprise suitable logic, circuitry, interfaces, and/or code that can use proper LO signals generated by the LOGEN 580 to down-convert the RF signals and to generate baseband signals.

The processor 550 may comprise suitable logic, circuitry, and/or code that may enable processing data and/or controlling operations of the communication device 500. In this regard, the processor 550 may be enabled to provide control signals to various other portions of the communication device 500. The processor 550 may also control transfers of data between various portions of the communication device 500. Additionally, the processor 550 may enable implementation of an operating system or otherwise execute code to manage operations of the communication device 500.

In one or more implementations, the processor 550 may include/represent a baseband processor. The baseband processor may comprise suitable logic, circuitry, interfaces, and/or code that may be operable to perform processing of baseband signals. The baseband processor may, for example, analyze received signals and generate control and/or feedback signals for configuring various components of the communication device 500 such as the receiver front-end 520. The baseband processor may be operable to encode, decode, transcode, modulate, demodulate, encrypt, decrypt, scramble, descramble, and/or otherwise process data in accordance with one or more communications standards. In some aspects, the baseband processor may perform the functionalities of the processing module 110 and/or the control module 120 of FIG. 1A.

The memory 570 may comprise suitable logic, circuitry, and/or code that may enable storage of various types of information such as received data, generated data, code, and/or configuration information. The memory 570 may comprise, for example, RAM, ROM, flash, and/or magnetic storage. In various embodiment of the subject technology, Information stored in the memory 570 may be utilized for configuring the receiver front-end 520 and/or the processor 550. In some implementations, the memory 570 may include the program module 260 of FIG. 2.

The local oscillator generator (LOG EN) 580 may comprise suitable logic, circuitry, interfaces, and/or code that may be operable to generate one or more oscillating signals of one or more frequencies. The LOGEN 580 may be operable to generate digital and/or analog signals. In this manner, the LOGEN 580 may be operable to generate one or more clock signals and/or sinusoidal signals. The power supply 580 may provide one or more regulated rail voltages (e.g., $V_{DD}$) for various circuitries of the communication device 500.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device for implementing a rate-distortion optimization (RDO)-based small transform coefficients suppression algorithm, the device comprising:

a processing module configured to process a prediction residual associated with a transform unit (TU) of a video frame and to generate a plurality of coefficients and a processed output;

a control block configured to receive the plurality of coefficients and to generate a control signal based on the plurality of coefficients; and a switch configured to receive the processed output from the processing module and a zero-out data from a zero-out block and to select, as an output of the device, one of the processed output or the zero-out data based on the control signal generated based on the plurality of coefficients comprising original coefficients, quantized coefficients, and inverse-quantized coefficients, wherein the zero-out data is generated by the zero-out block that is configured to assign a zero value to each of the plurality of coefficients of the TU.

2. The device claim 1, wherein the processing module is configured to process the prediction residual associated with the TU by performing transformation, quantization, inverse quantization, and inverse transformation on the prediction residual.

3. The device of claim 2, wherein the control block comprises a rate estimation module that is configured to estimate a rate (R) parameter based on an absolute value of a sum of the quantized coefficients.

4. The device of claim 2, wherein the control block comprises a first sum-of-square error (SSE) module that is configured to determine a first SSE-based distortion parameter based on the original coefficients.

5. The device of claim 2, wherein the control block comprises a second SSE module that is configured to determine a second SSE-based distortion parameter based on the original coefficients and the inverse-quantized coefficients.

6. The device of claim 5, wherein the control block comprises a combiner module configured to generate a combination of the second SSE-based distortion parameter and an estimated rate (R) parameter, wherein the estimated R parameter is estimated based on an absolute value of a sum of the quantized coefficients.

7. The device of claim 6, wherein the control block comprises a decision module that is configured to generate the control signal based on a first SSE-based distortion parameter, DC confidents, and the combination of the second SSE-based distortion parameter and the estimated R parameter.

8. The device of claim 6, wherein the combiner module is configured to generate the combination of the second SSE-based distortion parameter and the estimated R by using a parameter $\lambda$, wherein the combiner module is configured to determine the parameter $\lambda$ based on one or more lambda tables.

9. A method for suppressing small transform coefficients using a rate-distortion optimization (RDO)-based algorithm, the method comprising:

receiving a prediction residual associated with a transform unit (TU) of a video frame;

processing the prediction residual to generate a plurality of coefficients and a processed output;

generating a control signal based on the plurality of coefficients; and receiving the processed output and a zero-out data and selecting, as an output of a switch, one of the processed output or the zero-out data based on the control signal generated based on the plurality of coefficients comprising original coefficients, quantized coefficients, and inverse-quantized coefficients, wherein in the zero-out data a zero value is assigned to each of the plurality of coefficients of the TU.

10. The method claim 9, wherein processing the prediction residual associated with the TU comprises performing transformation, quantization, inverse quantization, and inverse transformation on the prediction residual.

11. The method of claim 10, wherein generating the control signal comprises estimating a rate (R) parameter based on an absolute value of a sum of the quantized coefficients.

12. The method of claim 10, wherein generating the control signal comprises determining a first SSE-based distortion parameter based on the original coefficients.

13. The method of claim 10, wherein generating the control signal comprises determining a second SSE-based distortion parameter based on the original coefficients and the inverse-quantized coefficients.

14. The method of claim 13, wherein generating the control signal comprises generating a combination of the second SSE-based distortion parameter and an estimated rate (R) parameter, and the method further comprises estimating the estimated R parameter based on an absolute value of a sum of the quantized coefficients.

15. The method of claim 14, wherein generating the control signal comprises generating the control signal based on a first SSE-based distortion parameter, DC confidents, and the combination of the second SSE-based distortion parameter and the estimated R parameter.

16. The method of claim 14, wherein generating the control signal comprises generating the combination of the second SSE-based distortion parameter and the estimated R by using a parameter $\lambda$, and wherein generating the combination comprises determining the parameter $\lambda$ based on one or more lambda tables.

17. A system for suppressing small transform coefficients using a rate-distortion optimization (RDO)-based algorithm, the system comprising:

memory; and one or more processors coupled to the memory to execute one or more program modules to perform:

processing a prediction residual to generate a plurality of coefficients and a processed output;

generating a control signal based on the plurality of coefficients; and receiving the processed output and a zero-out data and selecting, as an output of a switch, one of the processed output or the zero-out data based on the control signal generated based on the plurality of coefficients comprising original coefficients, quantized coefficients, and inverse-quantized coefficients, wherein the prediction residual is associated with a transform unit (TU) of a video frame, and wherein the zero-out data comprises a zero value for each of the plurality of coefficients of the TU.

18. The system of claim 17, wherein processing the prediction residual associated with the TU comprises performing transformation, quantization, inverse quantization, and inverse transformation on the prediction residual.

19. The system of claim 18, wherein generating the control signal comprises:

estimating a rate (R) parameter based on an absolute value of a sum of the quantized coefficients;

determining a first SSE-based distortion parameter based on the original coefficients; and determining a second SSE-based distortion parameter based on the original coefficients and the inverse-quantized coefficients.

20. The system of claim 19, wherein generating the control signal comprises generating the control signal based on the first SSE-based distortion parameter, DC confidents, and a combination of the second SSE-based distortion parameter and the estimated R parameter.

* * * * *